United States Patent [19]
Lee

[11] Patent Number: 6,167,474
[45] Date of Patent: *Dec. 26, 2000

[54] APPARATUS AND METHOD FOR DISTRIBUTED ARBITRATION OF SHARED RESOURCES

[75] Inventor: Sherman Lee, Rancho Palos Verdes, Calif.

[73] Assignee: Advanced Micro Devices, Inc., Sunnyvale, Calif.

[*] Notice: This patent is subject to a terminal disclaimer.

[21] Appl. No.: 09/015,587

[22] Filed: Jan. 29, 1998

Related U.S. Application Data

[63] Continuation of application No. 08/434,358, May 5, 1995, Pat. No. 5,754,777, which is a continuation-in-part of application No. 08/399,323, Mar. 6, 1995, abandoned.

[51] Int. Cl.[7] .................................................... G06F 13/00
[52] U.S. Cl. ........................................... 710/107; 710/113
[58] Field of Search ........................... 710/107, 113–125, 710/126, 129, 240, 241, 242

[56] References Cited

U.S. PATENT DOCUMENTS

| | | | |
|---|---|---|---|
| 3,191,095 | 6/1965 | Hefti . | |
| 4,418,971 | 12/1983 | Liss | 339/17 L |
| 4,468,612 | 8/1984 | Starr | 324/66 |
| 4,569,044 | 2/1986 | Tao et al. | 370/85 |
| 4,973,264 | 11/1990 | Kamono et al. | 439/498 |
| 5,181,858 | 1/1993 | Matz et al. | 439/188 |
| 5,288,246 | 2/1994 | Whiteman, Jr. et al. | 439/571 |
| 5,330,370 | 7/1994 | Redderson et al. | 439/502 |
| 5,366,382 | 11/1994 | Thumma | 439/188 |
| 5,374,200 | 12/1994 | Giroux | 439/188 |
| 5,459,840 | 10/1995 | Isfeld et al. | 395/309 |
| 5,470,243 | 11/1995 | Bendorf | 439/188 |

OTHER PUBLICATIONS

Advanced Micro Devices, Am79C987 Hardware Implented Management Information Base™ (HIMIB™) Device: Preliminary Data Sheet, Feb. 1993, (Full Text).

Advanced Micro Devices, ISA–HUB™–KT Am 79C981 and Am 79C987 Based Ethernet Managed Server Hub Card: Final Data Sheet, Feb. 1993, (Full Text).

Advanced Micro Devices, Am79C981/Am79C987 IMR+/HIMIB Security Features, Aug. 1993, (Full Text).

Advanced Micro Devices, *IEEE 802.3 Repeater: Technical Manual*, 1993, (Full Text).

Advanced Micro Devices, *ISA–HUB™: User's Guide and Reference Manual*, 1993, (Full Text).

Advanced Micro Devices, *Managed IEEE 802.3 Repeaters: "MIB in a Chip"*, 1993, (Full Text).

*Primary Examiner*—Ayaz R. Sheikh
*Assistant Examiner*—David A. Wiley
*Attorney, Agent, or Firm*—Skjerven Morrill MacPherson LLP; Omkar K. Suryadevara; David C. Hsia

[57] ABSTRACT

A novel distributed arbitration apparatus in accordance with this invention includes a plurality of electrical devices, such as Industry Standard Architecture (ISA) hub cards, that independently determine availability of a shared resource, such as a bus that interconnects the devices, by use of an arbiter. When a circuit in an electrical device needs to use the bus, the circuit drives a request signal active to an arbiter, for example, in the form of a programmable logic device, such as a Programmable Array Logic (PAL™) device included in the electrical device. The arbiter in turn transmits the request signal to all other arbiters. Therefore, each arbiter receives and monitors request signals from all circuits. If only one request signal is active at a given time, all arbiters receive the active request signal and each arbiter drives an acknowledge signal active to the respective local circuit. The circuit that requested the shared resource then uses the resource. If more than one request signal is active simultaneously, each arbiter determines the occurrence of a collision, and drives a collision signal active to the respective local circuit that then implements a backoff algorithm.

29 Claims, 8 Drawing Sheets

APPARATUS AND METHOD FOR DISTRIBUTED ARBITRATION OF SHARED RESOURCES

CROSS-REFERENCE TO RELATED APPLICATIONS

This application is a continuation of U.S. patent application Ser. No. 08/434,358 U.S. Pat. No. 5,754,777, filed May 5, 1995, that is in turn continuation-in-part application of the U.S. patent application Ser. No. 08/399,323, now abandoned, filed Mar. 6, 1995, and entitled "APPARATUS AND METHOD TO UNIQUELY IDENTIFY SIMILARLY CONNECTED ELECTRICAL DEVICES" by Sherman Lee, assigned to the same assignee as the present application and that is incorporated by reference herein in its entirety.

FIELD OF THE INVENTION

This invention generally relates to a distributed arbitration apparatus and method in which a number of devices independently determine availability of a shared resource. In particular, this invention relates to repeater cards that independently determine availability of a bus that interconnects the cards.

CROSS-REFERENCE TO TABLE A

Table A of 3 pages, incorporated herein by reference in its entirety, is a listing of the equations of a programmable array logic device included in an ISA hub card that is attached to an identity cable in accordance with this invention.

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

Ethernet over Unshielded Twisted Pair (UTP) cables based on the 10 Base-T standard (as described in sections 13 and 14 of IEEE Standard 802.3i-1990—that is a supplement to ISO/IEC 8802-3:1990, Product Number SH16337 available from IEEE Service Center, 445 Hoes Lane, P.O. Box 1331, Piscataway, N.J., USA 08855-1331, and that is incorporated herein in its entirety), using hub cards (sometimes referred to as "concentrators" or "repeaters") in the center of a star-wired configuration is popular in modern offices. Use of UTP cables that can also be used in telephone systems provides flexibility to moves, changes and additions, without rewiring the modern office.

One example of prior art hub cards are ISA hub cards 101–103 (FIG. 1A) that contain a predetermined number of ports, such as Twisted Pair (TP) ports J4 (FIG. 1A), that support an ethernet with eight 10 Base-T stations, for example, personal computers (PCs).

Figure 1A:
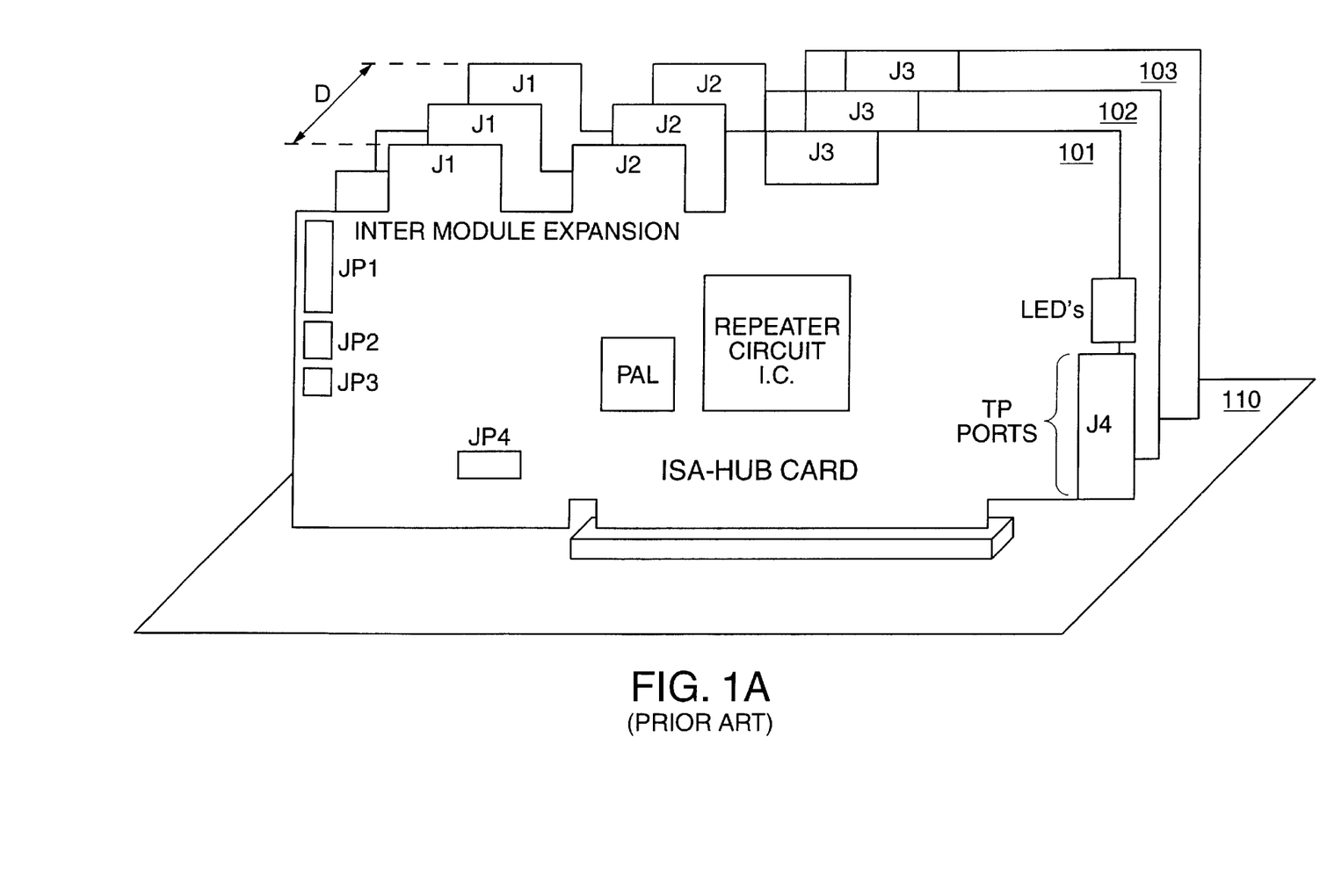
FIG. 1A illustrates three prior art ISA hub cards that are supported by a system board.

ISA hub cards 101–103 of FIG. 1A are 10 Base-T Ethernet repeater cards, such as "ISA-HUB™-KT" available from Advanced Micro Devices, Inc. (AMD™), One AMD Place, P.O. Box 3453, Sunnyvale, Calif. 94086, and described in ISA-HUB™ Users' Manual (also available from AMD™), that is incorporated by reference herein in its entirety.

An ISA hub card, such as card 101, supports the physical topology of an Ethernet network, allowing two or more 10 Base-T stations that are connected to connectors J4 to communicate with each other. When data is received on a single port of connector J4, ISA hub card 101 retransmits the received data to all other ports of connector J4, performing signal retiming and amplitude restoration. When data appears simultaneously on more than one port, ISA hub card 101 transmits a collision signal to all ports of connector J4, including ports of the transmitting and receiving 10 Base-T stations.

ISA hub cards 101–103 can be supported by a single system board 110 to take advantage of shared costs, for example, of the power suppply. Use of a single system board 110 offers easy expansion by allowing installation of additional hub cards (not shown). Although only three ISA hub cards are illustrated in FIG. 1A, up to eight ISA hub cards can be mounted on system board 110. Use of a single system board 110 also allows use of redundant power supplies, support for multiple LAN segments, support for different media access protocols, such as token ring and different media types such as UTP, coaxial cable and fiber optics.

An expansion interface comprising connectors J1 and J2 (FIG. 1A) in each ISA hub card 101–103 allows a number of ISA hub cards 101–103 to act in concert as a single aggregate ISA hub, thereby providing a single ethernet network for an office that contains a larger number of PCs (e.g. 24 PCs) than the number of ports (e.g. 8 ports) on a single ISA hub card. In such a case, a connector, e.g. connector J1 of an ISA hub card is connected to a corresponding connector, e.g. connector J1, of another ISA hub card. Connection of multiple ISA hub cards is described in for example, "IEEE 802.3 Repeater, Technical Manual" available from AMD™ (above), and that is incorporated by reference herein in its entirety. ISA hub cards 101–103 are interconnected by conventional cables, such as cable 120 (FIG. 1B) that has straight through, e.g. one-to-one wiring 131–135 between a left connector 140 having terminals 141–145 and a right connector 150 having terminals 151–155.

Any of ISA hub cards 101–103 can be configured to perform a master function by placing a single jumper in the "M" position as described in the ISA-HUB™ User's Manual referenced above. All ISA hub cards in an aggregate ISA hub, other than a master ISA hub card, are slaves that are assigned unique identities by placing a single jumper (e.g. jumper JP1 in FIG. 1A) at a unique position other than the M position as described in the ISA-HUB™ User's Manual (above).

In a prior art ethernet, the master ISA hub card is also responsible for reset synchronization and for centralized arbitration. Centralized arbitration is performed by a programmable array logic (PAL™) device 115 of the master ISA hub card. Although a PAL™ device is included in every ISA hub card, only the PAL™ device in a master ISA hub card is enabled.

The master ISA hub card's PAL™ device 115 (also called master arbitration PAL™ device) performs centralized arbitration by monitoring request signals on a number of request lines of cable 120. Each request signal originates from one of ISA hub cards 101–103 as follows. The PAL™ device of a ISA hub card that receives a packet from an ethernet node drives a request signal active and waits for an acknowledge signal to go active before transmitting the received packet to other ISA hub cards e.g. on cable 120.

Master arbitration PAL™ device 115 generates a collision signal that is transmitted on a collision line to all ISA hub cards 101–103 when more than one request line is active simultaneously. If only one request line has an active request signal, master arbitration PAL™ device 115 generates an acknowledge signal that is also transmitted to all ISA hub cards 101–103. Only the ISA hub card that generated the active request signal responds to the active acknowledge signal and transmits a packet e.g. on cable 120. All other ISA hub cards wait to receive the packet in response to the active acknowledge signal.

The principles of centralized arbitration are explained in detail in the prior art, for example, in section 5.5.2 at page 5–9 of "IEEE 802.3 Repeater, Technical Manual" that was incorporated by reference above. Equations for implementing such a master arbitration PAL™ device are also well known, for example, as listed in section 5.5.4 at page 5–10 of "IEEE 802.3 Repeater, Technical Manual" (above).

Centralized arbitration has several drawbacks. For example, centralized arbitration requires that a slave ISA hub card 101–103 wait for the time required for a request signal to travel the expansion cable distance (e.g. distance D in FIG. 1A) between the slave ISA hub card and master ISA hub card and the time required for an acknowledge signal to travel back the expansion cable distance from the master ISA hub card, which wait imposes a limitation on the speed of the network (such as an ethernet). In one prior art ethernet, a slave ISA hub card waits for a travel time of 100 nanoseconds, which wait limits the prior art ethernet to a speed of 10 megahertz. Also, a malfunction in the master arbitration PAL™ device can cause unpredicted and improper operation of the aggregate hub.

SUMMARY OF THE INVENTION

A novel distributed arbitration apparatus in accordance with this invention includes a plurality of electrical devices (such as Industry Standard Architecture (ISA) hub cards), that independently determine availability of a shared resource (such as a bus that interconnects the devices), by use of an arbiter in each of the electrical devices. One of the electrical devices, called master device, generates a clock signal that is supplied to all the other electrical devices, called slave devices. All the electrical devices synchronize to the clock signal i.e. generate signals, such as a request signal, synchronously and sample signals, such as a grant signal, synchronously.

When a circuit in an electrical device needs to use the shared resource, the circuit drives a request signal active to a local arbiter (for example, in the form of a programmable logic device, such as a Programmable Array Logic (PAL™) device) included in that electrical device. The local arbiter in turn transmits the request signal to all other arbiters of devices that use the shared resource. Therefore, each arbiter receives and monitors request signals from all other arbiters.

If only one request signal is active at a given time, all arbiters receive the active request signal and each arbiter drives an acknowledge signal active to the respective local circuit. The circuit that requested the bus then uses the bus.

If more than one request signal is active simultaneously, each arbiter determines the occurrence of a collision, and drives a collision signal active to the respective local circuit that then implements a backoff algorithm, such as, but not limited to an exponent binary algorithm.

The novel distributed arbitration method and apparatus described above has several advantages. Distributed arbitration is faster because a circuit receives an acknowledge signal or a collision signal from an arbiter that is locally connected to the circuit rather than from a remote arbiter, as was necessary in the prior art. So the length of the bus connecting the arbiters is a less critical dimension for implementing distributed arbitration than for centralized arbitration. A longer bus made possible by the current invention allows a larger number of arbiters to be connected together to form a larger aggregate hub than possible in the prior art.

Also, distributed arbitration described above requires a smaller number of conductors in the bus as compared to the prior art because two signals namely acknowledge and collision signals no longer need to be transmitted over the bus, and instead only one signal, namely the request signal is transmitted on the bus. Distributed arbitration also provides better signal integrity and better scalability.

DETAILED DESCRIPTION

One embodiment of this invention includes a plurality of electrical devices (described below), each of which has an arbiter (also described below) that independently determines availability of a shared resource, such as a bus included in identity cable 200 that interconnects the electrical devices.

Figure 2A:
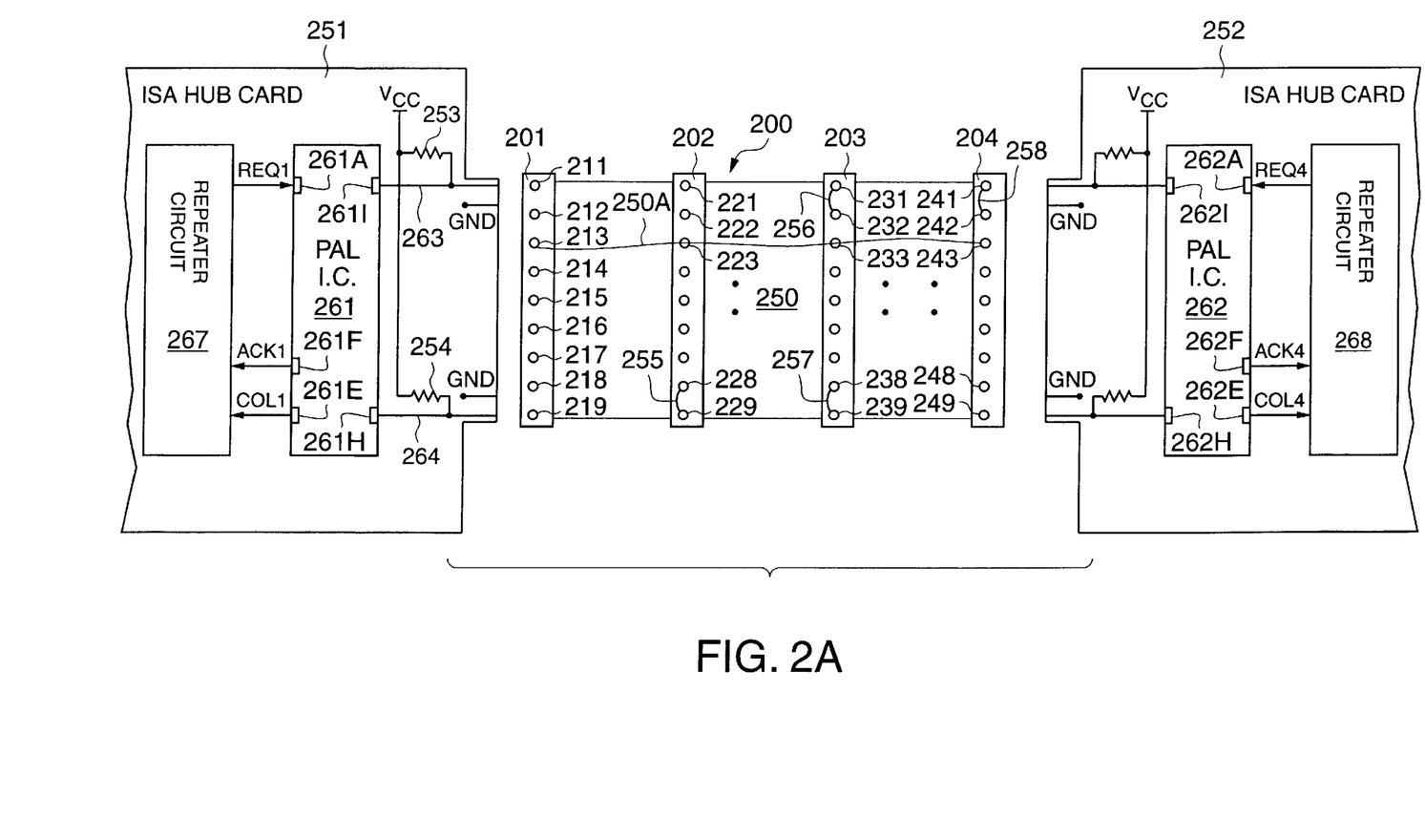
FIG. 2A illustrates use of the distributed algorithm of this invention by PAL™ devices in two ISA hub cards in one embodiment.
Figure 2B:
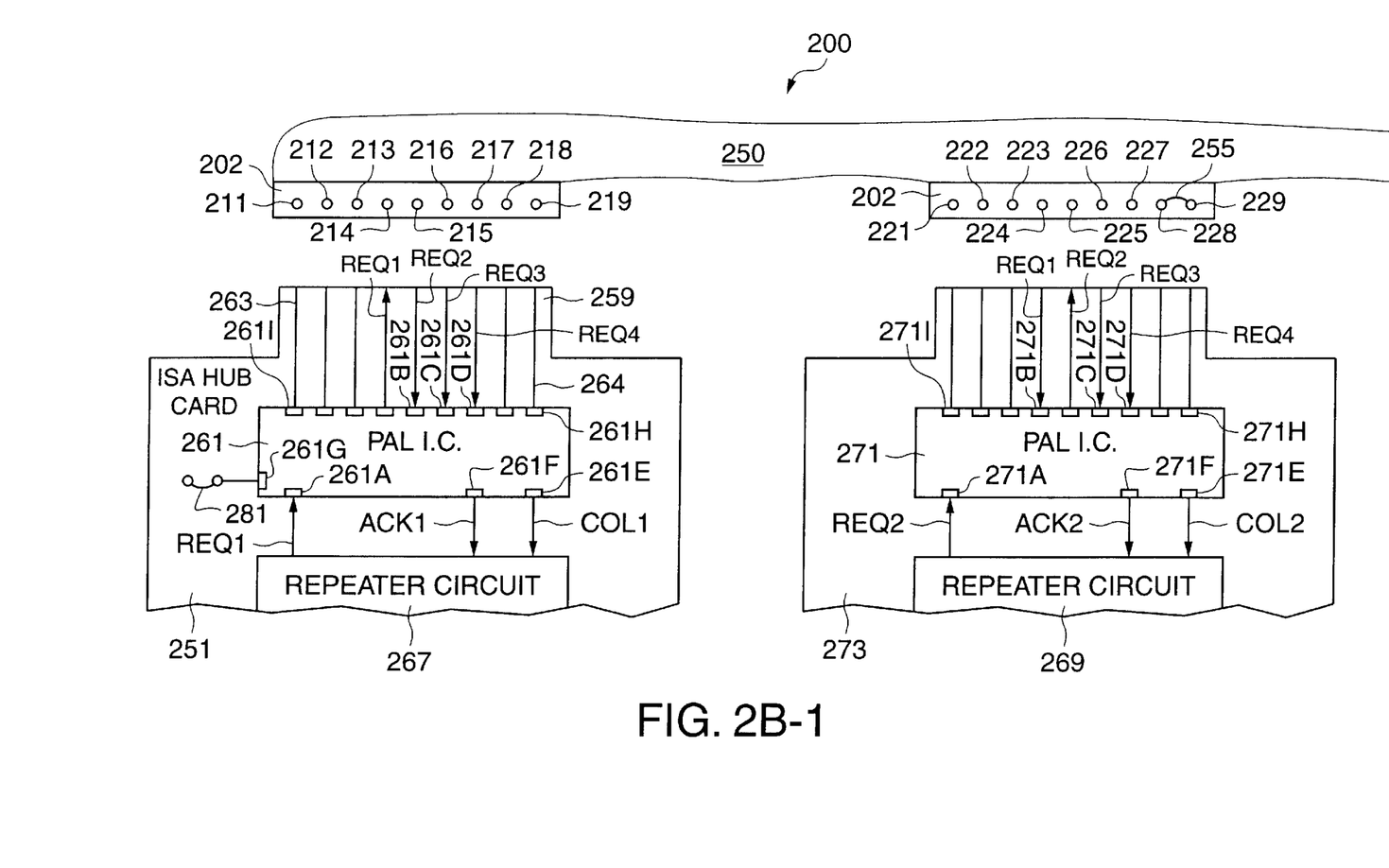
FIG. 2B (consisting of 2B-1 and 2B-2) illustrates the signals between PAL™ devices in four ISA hub cards in one embodiment.

Identity cable (also called simply "cable") 200 includes a first cable connector 201 located at a left end of cable 200, a second cable connector 202 located next to first cable connector 201, a third cable connector 203 located next to second cable connector 202 and a fourth cable connector 204 located at a right end of cable 200.

Each of cable connectors 201–204 includes a group of terminals 211–219, 221–229, 231–239 and 241–249 respectively. Cable 200 also includes a sheath 250 that supports and insulates electrical conductors, e.g. conductor 250A that interconnect various terminals between connectors of the identity cable. In two alternative embodiments, sheath 250 is a flexible ribbon or a rigid brace.

Figures 2B, 2B:
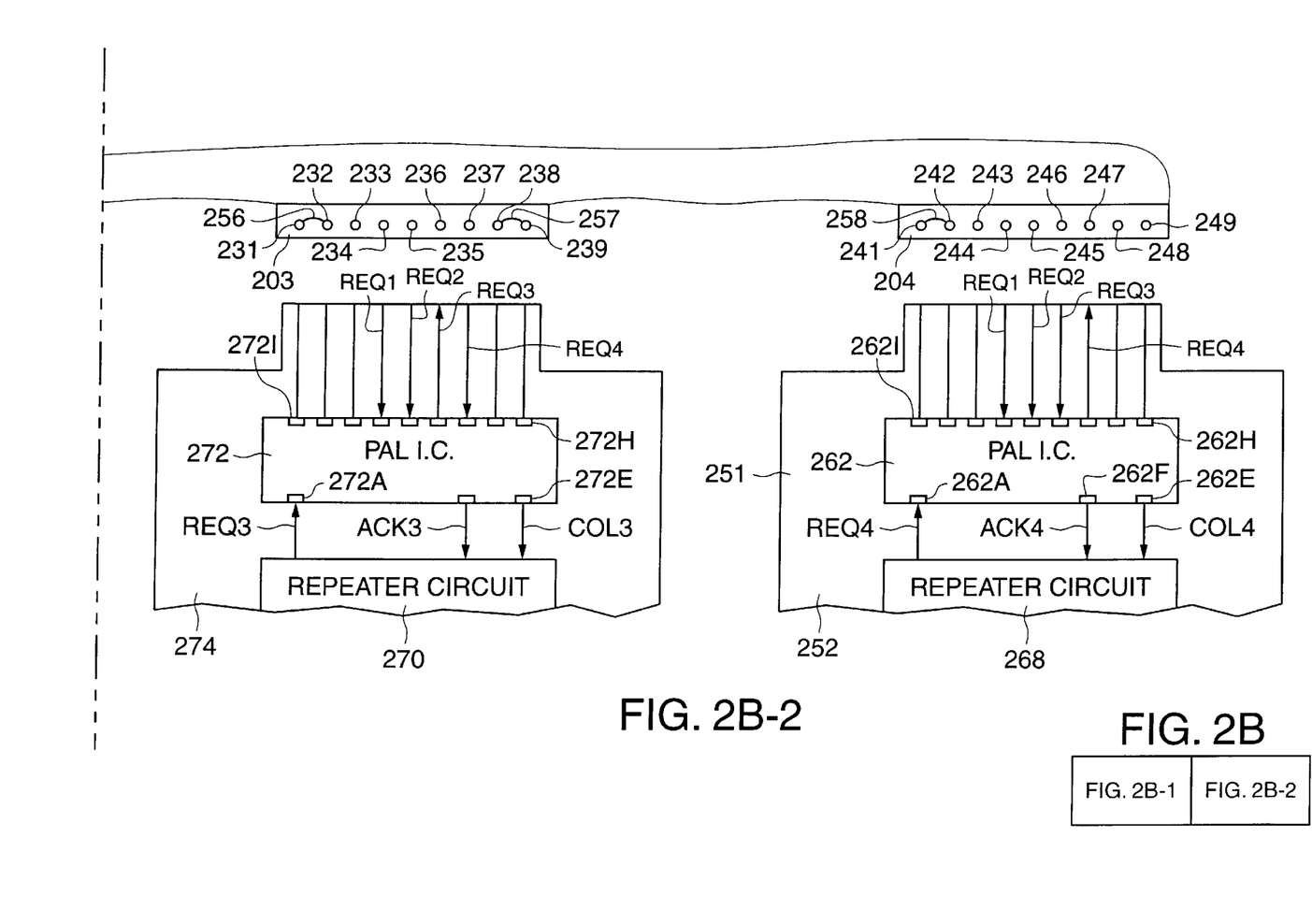

Connectors 201–204 are suitable for coupling to terminals of an electrical device, such as one of ISA hub cards 251 and 252. Although only two ISA hub cards 251 and 252 are illustrated in FIG. 2A, a total of four electrical devices can be interconnected by cable 200, as illustrated in FIG. 2B.

In the embodiment illustrated in FIG. 2A, two terminals of each cable connector, such as terminals 211 and 219 of cable connector 201, are "identity terminals" that can uniquely identify an electrical device attached to cable 200, such as one of ISA hub cards 251–252. The attached electrical device, e.g. ISA hub card 251 couples identity terminals 211 and 219 through pullup resistors 253 and 254 respectively to a voltage source, at for example, the Vcc reference (FIG. 2A). In one specific embodiment, each pullup resistor has 1000 Ω resistance. In the embodiment of FIG. 2A, each cable connector also includes two terminals, such as terminals 212 and 218 of cable connector 201, that are "ground terminals" coupled by the attached electrical device, e.g. ISA hub card 251, to a ground reference source.

Cable 200 provides a unique identity to two or more attached electrical devices as follows. Each cable connector can include one or more conductive links such as wires that couple an identity terminal to a ground terminal, for example, to indicate logic state "1". Alternatively an identity terminal is left unconnected inside cable 200, for example, to indicate logic state "0".

In the embodiment of FIG. 2A, identity terminals 211 and 219 are left unconnected so that cable connector 201 can indicate the identity "00". Identity terminal 221 is left unconnected while identity terminal 229 is connected to ground terminal 228 by a short conductive link 255, so that cable connector 202 can indicate the identity "01". Identity terminals 231 and 239 are connected by conductive links 256 and 257 to ground terminals 232 and 238 respectively so that cable connector 203 can indicate the identity "11". Finally, identity terminal 241 is connected by conductive link 258 to ground terminal 242, while identity terminal 249 is left unconnected so that cable connector 204 can indicate the identity "10".

The rest of the terminals in cable 200 that carry conventional signals are connected with straight through wiring in the conventional manner, for example, wire 250A connects terminals 213, 223, 233 and 243. For clarity, not all wires of cable 200 are shown in FIGS. 2A and 2B.

Such an identity cable 200 eliminates the hub card's jumpers or dip switches that were needed in prior art ISA hub cards 101–103 (above) to indicate identity. Cable 200 can provide unique identities to each attached electrical device, irrespective of the specific position of the electrical device with respect to cable 200, even if the electrical devices are all identical to each other.

In one embodiment, identity conductors are located at the outer edges (FIG. 2A) of identity cable 200, to assure stable impedance characteristics for identity cable 200.

If there is a "master-slave" relationship wherein one electrical device is a master and all other electrical devices are slaves, then one electrical device must be connected to the specific connector that indicates master identity, while other electrical devices can be connected to any other connector of cable 200. For example, when cable 200 is used with ISA hub cards, one ISA hub card must be connected to the cable connector that indicates the identity "00", such as cable connector 201, so that the aggregate ISA hub formed by cable 200 has one (and only one) master. Use of the specific identity "00" for a master has the advantage that in an ISA hub with only one ISA hub card, e.g. card 251, the connector, e.g. connector 259, can be left unconnected and yet the ISA hub has an ISA hub card, e.g. card 251, with master identity "00".

The function of sensing identity in an attached electrical device is performed by an arbiter. An arbiter can be implemented in a programmable logic device (PLD) such as one of PAL™ devices 261 and 262 of ISA hub cards 251 and 252 respectively. Each one of PAL™ devices 261 and 262 is similar to PAL™ devices of a prior art ISA hub card. Equations for a PAL™ device in one embodiment of an ISA hub card of this invention are listed in Table A, are in Data I/O's Abel language, and can be used with Data I/O's Unisite programmer to program, for example, PALCE20V8-25, also available from AMD™, Inc. to form an arbiter.

In this embodiment, all portions of the ISA hub card that are not disclosed herein are identical to those in a prior art ISA hub card, as described in, for example, ISA-HUB™ User's Manual referenced above.

Each one of ISA hub cards 251 and 252 that is attached to cable 200 has a number of identity lines, such as identity lines 263 and 264, that are coupled to identity terminals, such as identity terminals 211 and 219, when the electrical device is attached to an identity connector. Each one of PAL™ devices 261 and 262 senses the voltage level (and hence the logic state) of the signals on the identity lines to determine the identity of ISA hub cards 251 and 252 respectively. When connectors 201 and 204 are coupled to ISA hub cards 251 and 252 respectively, ISA hub card 251 senses identity "00" and acts as master while the other ISA hub card 252 senses the identity "10" and acts as a slave. As noted above, the connections of connectors 201 and 204 and cards 251 and 252 can be reversed without any loss of functionality.

In one embodiment, PAL™ devices 261 and 262 implement a novel distributed arbitration method in which collision and acknowledge signals are generated by each PAL™ device and supplied to a repeater circuit that is directly connected to the PAL™ device within a ISA hub card. When a repeater circuit, such as repeater circuit 267 needs to transmit a packet on cable 200, the repeater circuit drives a request signal active on one of the wires of cable 200. Each PAL™ device, such as PAL™ device 261 of ISA hub card 251 monitors request signals on request lines REQ1–REQ4 (FIG. 2B) from all repeater circuits (e.g. repeater circuits 267–270) that are connected by cable 200. Each PAL™ device (e.g. PAL™ device 261) receives a request signal from a local repeater circuit (e.g. repeater circuit 267) on for example a local request terminal 261A coupled to a local request line (e.g. line REQ1) of the ISA hub card (e.g. card 251). Each PAL™ device (e.g. PAL™ device 261) also receives request signals from remote repeater circuits (e.g. circuit 268) on remote request terminals 261B–261D couplable to wires (not shown) of cable 200.

Each one of PAL™ devices 261, 262, 271 and 272 determines the occurrence of a collision, if more than one request signal, e.g. on request lines REQ1–REQ4, is active simultaneously, and then drives a collision signal active, e.g. on each of collision terminals 261E, 271E, 272E and 262E coupled to collision lines COL1–COL4 of the respective local repeater circuit e.g. each of repeater circuits 267–270. If only one request signal is active at a given time, all PAL™ devices receive the active request signal on e.g. request line REQ1, and each of PAL™ devices 261, 262, 271 and 272 drives an acknowledge signal active e.g. on acknowledge terminals 261F, 271F, 272F and 262F coupled to acknowledge line ACK1 of the respective local repeater circuit, e.g. repeater circuits 267–270.

The novel distributed arbitration method described above has several advantages. The distributed arbitration scheme is faster because an electrical device's circuit, such as repeater circuit 267, receives an acknowledge signal on acknowledge line ACK1 or a collision signal on collision line COL1 from an arbiter that is locally connected to the repeater circuit, such as PAL™ device 265, rather than from a remote arbiter, as was necessary in the prior art. Therefore, the expansion cable distance of cable 200 is a less critical dimension for implementing distributed arbitration than for centralized arbitration. For example, an aggregate ISA hub formed of ISA hub cards 251–252 and 273–274 that are connected by an identity cable of the same length as the prior art expansion cable distance can run at twice the prior art speed. Alternatively, an aggregate ISA hub running at the same speed as a prior art speed can be formed of twice as many ISA hub cards as in the prior art because the expansion cable distance can be twice the prior art expansion cable distance. The doubled speed or the doubled distance of this invention are possible because a repeater circuit, e.g. one of circuits 267–270 is only limited by the travel time of a single expansion cable distance (for the request signal).

Figure 1B:
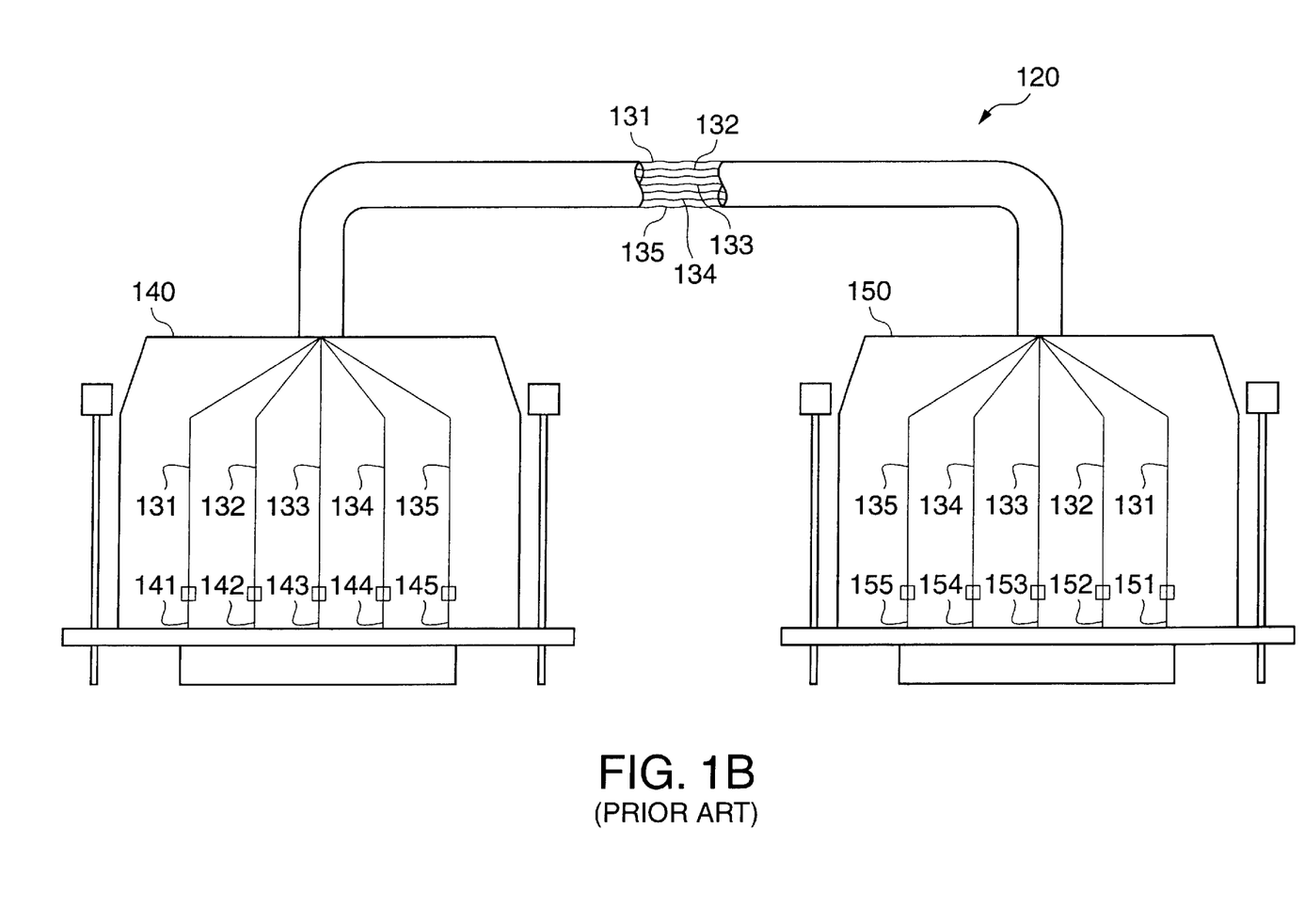
FIG. 1B illustrates a prior art cable for interconnecting the ISA hub cards of FIG. 1A.
Figure 1C:
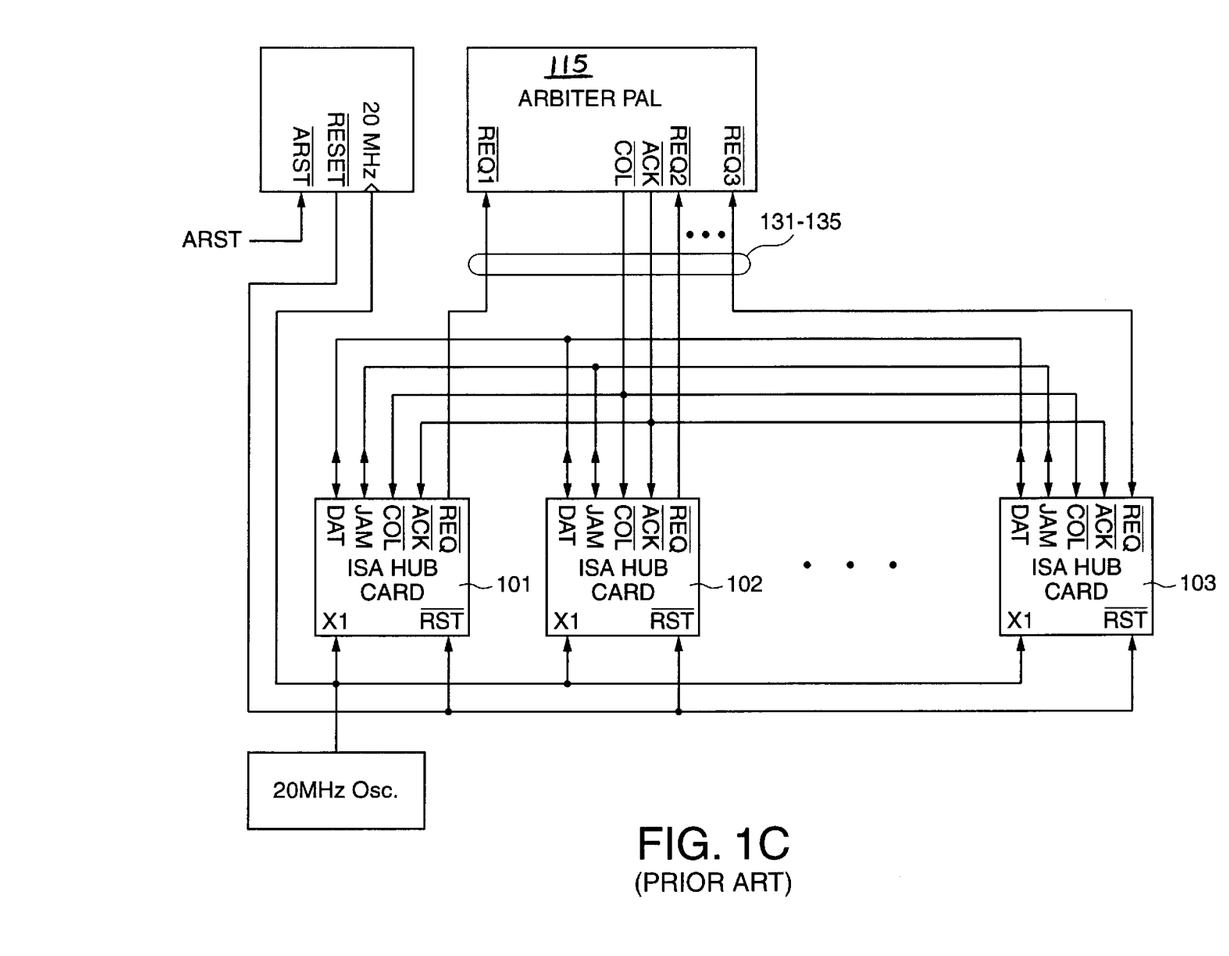
FIG. 1C illustrates in block diagram the interconnection of the ISA hub cards of FIG. 1A.

The distributed arbitration method described above requires a smaller number of straight-through wires in cable 200, as compared to the prior art because the acknowledge signal and the collision signal are no longer transmitted over cable 200, although the request signal from a repeater circuit of a master ISA hub card is transmitted on cable 200. The master repeater circuit's request signal, e.g. on request line REQ1 allows slave ISA hub cards, e.g. cards 252, 273 and 274 to arbitrate in parallel with the master ISA hub card, e.g. card 251. For example, in the embodiment illustrated in FIG. 2A, identity cable 200 has four request lines 213–217, as compared to prior art cable 120 that has only three request lines 133, 134 and 135 but also has two lines 132 and 133 for acknowledge and collision signals. Distributed arbitration also provides better signal integrity.

Although the novel distributed arbitration method has been described above with an identity cable specifying the identity of an electrical device, other identity mechanisms can be used, including for example, user configurable elements such as jumpers, dip-switches and programmable fuses. For example, a PAL™ device 261 can include an identity terminal 261G (FIG. 2B) coupled on card 251 to a jumper 281 that can be set by a user to indicate different identities of card 251. Programmable fuses can be, for example, part of a field programmable gate array included in an integrated circuit that contains an arbiter and a repeater circuit.

Also, although a novel distributed arbitration method is described above for use in ISA hub cards connected by an identity cable, the novel identity apparatus can be used with other arbitration methods. For example, a prior art centralized arbitration method can be implemented in ISA hub cards that sense identities from an identity cable. Moreover, the novel distributed arbitration method can be used in ISA hub cards with prior art identity mechanisms, such as manually configured jumpers or dip-switches.

Although specific connections between ISA hub cards 251–252 and cable 200 are illustrated in FIG. 2A, other connections are also possible. For example, connector 259 of ISA hub card 251 can be connected to fourth cable connector 204 while connector 256 of ISA hub card 252 is connected to first cable connector 201. Since ISA hub cards 251 and 252 are identical to each other, such a connection, that is reverse of the connection shown in FIG. 2A, still results in the same functionality. Similarly connecting first connector 201 to ISA hub card 251 and second connector 202 to ISA hub card 252 results in the same functionality.

An even number of identity terminals (e.g. two identity terminals) provides symmetry to cable 200 that permits reversibility (e.g. cable 200 providing identities "01", "00", "11" and "10" in a first orientation with respect to four electrical devices can be connected in a second orientation spatially reversed with respect to the first orientation to provide identities "10", "11", "00" and "01"), without loss of uniqueness of identity. When multiple hub cards are interconnected by cable 200, the specific identity of each hub card is irrelevant as long as there is only one master hub card and all other hub cards have identities unique with respect to each other.

Numerous variations in identity order can cover the entire permutation of possible identities indicated by an identity cable. For example, in a variation of the embodiment of cable 200 described above, identity terminals 221, 229 and 211 can be left unconnected while terminal 219 is connected to ground terminal 218, so that cable connector 202 indicates the identity "00" and cable connector 201 indicates the identity "01." Other identities "10" and "11" can also be indicated by cable connector 202 by appropriate coupling of identity terminals to the ground reference source. The range of possible identities can be expanded by increasing the number of identity terminals in an identity apparatus, for example from 2 identity terminals (four identities) to 4 identity terminals (sixteen identities). Other numbers of identity terminals are also possible.

Although wires 241 and 242 are used in one embodiment as conductive links to couple the identity terminals and the ground terminals, other electrical couplings can also be used, and an identity apparatus can have a form other than a cable. In one embodiment, an inflexible structure, such as system board 300 (FIG. 3A) rigidly supports a number of identity connectors 301–304 that are similar to identity connectors 201–204 (FIG. 2A) except as described below. Connectors 301–304 (FIG. 3A) do not have ground terminals, such as ground terminals 212 and 218 (FIG. 2A). Instead, terminals 312 and 318 are connected straight through by traces (not shown) in system board 300 to terminals 322, 332 and 342 and to 328, 338 and 348 respectively and are used for signal transmission between ISA hub boards (not shown) attached to identity connectors 301–304. Identity terminals, such as terminals 311 and 319 (FIG. 3A) of connector 301 are connected inside system board 300 to the ground reference source or pulled up through pull-up resistors, e.g. resistors 353–354 to the Vcc reference, as necessary to indicate an identity.

Figure 3A:
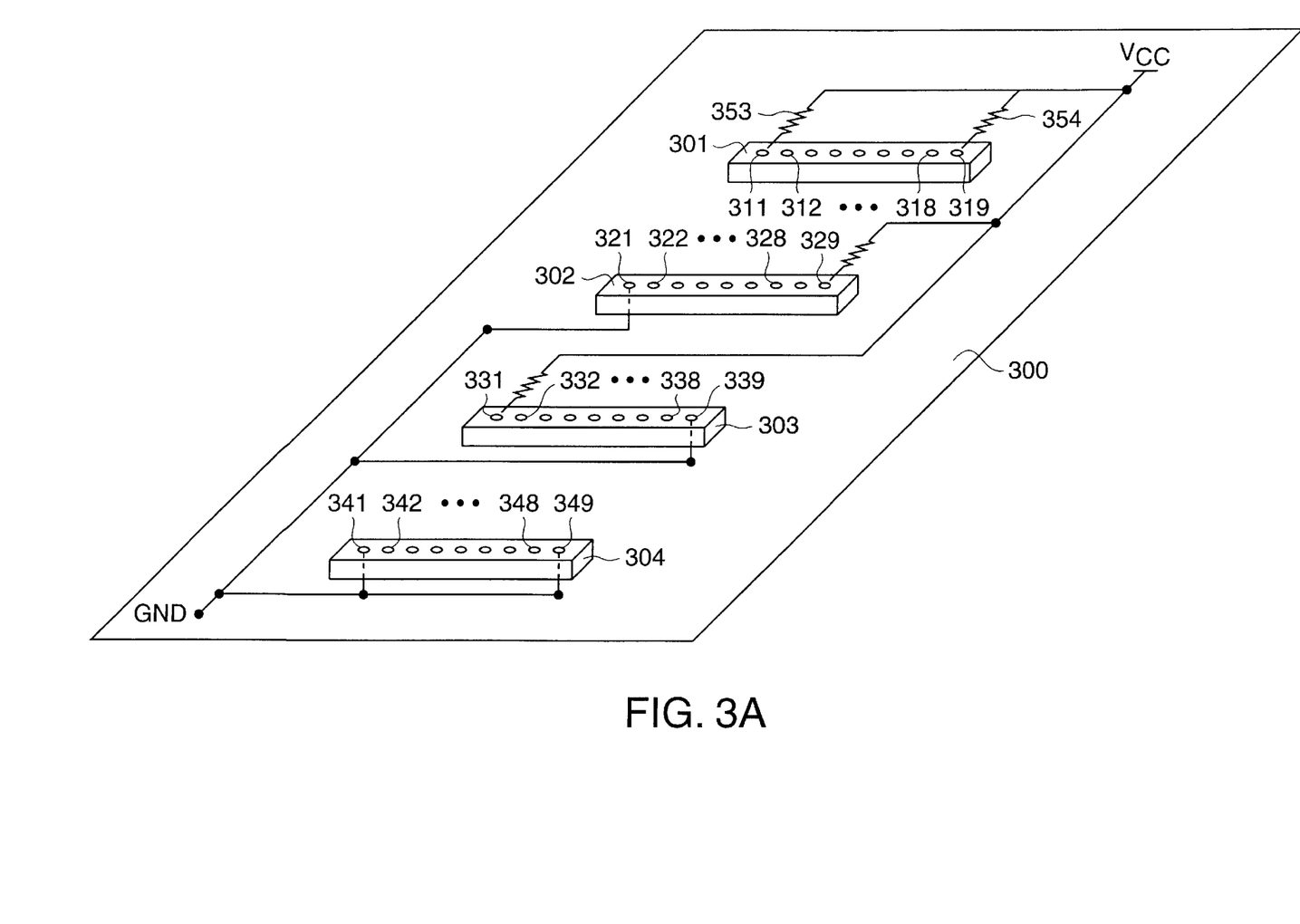
FIG. 3A illustrates a system board for interconnecting four ISA hub cards in another embodiment of this invention.
Figure 3B:
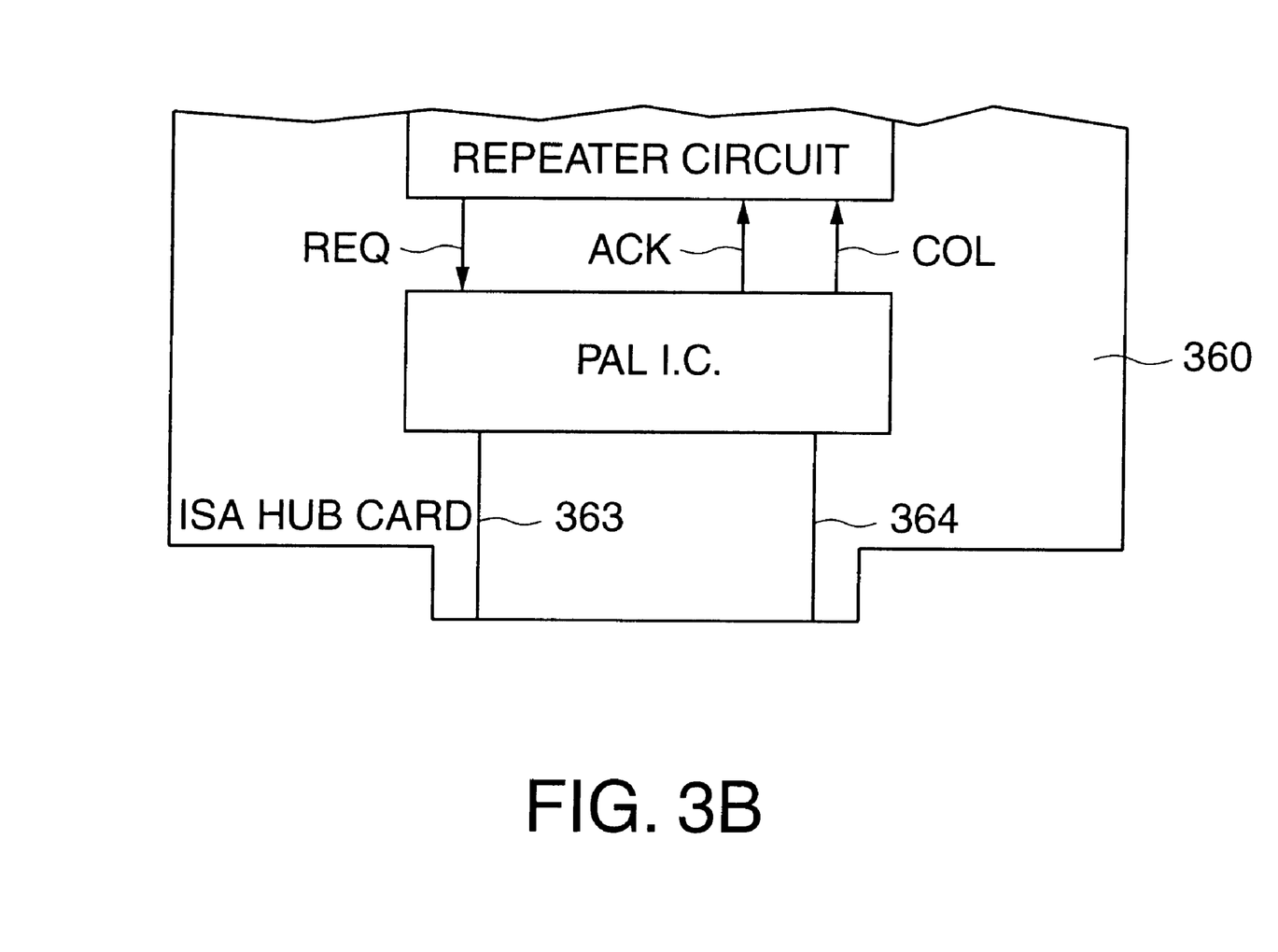
FIG. 3B illustrates an ISA hub card for use with the system board of FIG. 3A.

For use with system board 300, an attached electrical device e.g. ISA hub card 360 (FIG. 3B) does not provide connections to a source of the ground reference or of the Vcc reference as described above for ISA hub cards 251 and 252. However, each attached electrical device e.g. ISA hub card 360 senses the voltage on the identity lines e.g. lines 363 and 364, in the manner described above e.g. for lines 263 and 264 of ISA hub card 251.

An identity apparatus e.g. cable 200 or system board 300 that is external to an electrical device to be identified, as described above, has several advantages. Each of the electrical devices is identical to every other electrical device, resulting in elimination of jumpers (or dip switches) and thus reducing the electrical device's fabrication cost.

Moreover, the cost of assembling an aggregate ISA hub that includes a number of ISA hub cards is reduced, due to elimination of the error-prone, laborious step of setting jumpers or dip switches. Use of identity cable 200 or system board 300 eases assembly of such an aggregate ISA hub.

Numerous other advantages of an identity apparatus will be obvious to those skilled in the art of "plug and play", based on the enclosed disclosure. For example, as minimal forethought is needed for connecting an identity apparatus to an electrical device, this invention results in time saving during assembly. Also, reversibility of the identity apparatus results in idiot-proof assembly.

Numerous modifications and adaptations of the invention will be obvious in view of the enclosed disclosure. For example, a system board can contain only traces that connect identity terminals to a ground reference source (as described in reference to FIG. 3A), while the identity terminals are coupled by pull-up resistors in the attached electrical devices to a voltage source (as described in reference to FIG. 2A).

Although negative logic states are illustrated in the above description, wherein the Vcc reference indicates logic state "0" and the ground reference indicates logic state "1", positive logic states with logic states reverse of the negative logic states can also be used.

Although PAL™ device embodiment has been described above, an arbiter of this invention can be embodied in a part of an integrated circuit, and furthermore, a repeater circuit can be implemented as another part of the same integrated circuit (or a different integrated circuit).

Although in one embodiment, distributed arbitration and arbiters are used to share the use of a bus connecting a plurality of electrical devices, distributed arbitration and arbiters can be used to share other resources that are always available (e.g. a spinning disk drive) and used by the requesting electrical device.

Various modifications and adaptations of the embodiments described above are encompassed by the attached claims.

TABLE A

| MODULE | ISAHUB1 | |
|---|---|---|
| TITLE | 'ISAHUB1.ABL, Rev. 1.0, 10/02/94' | |
| DECLARATIONS | | |
| ISAHUB1 | device | 'MACH110A'; |
| "IMR+ Signals" | | |
| SO | PIN 30; | |
| STR | PIN 35; | |
| !REQ | PIN 32; | |
| X1 | PIN 14 | istype 'Com,Buffer'; |
| TEST | PIN 9 | istype 'Com,Buffer'; |
| JAM | PIN 21 | istype 'Com,Buffer'; |
| DAT | PIN 20 | istype 'Com,Buffer'; |
| !ACK | PIN 15 | istype 'Com,Invert'; |
| !COL | PIN 6 | istype 'Com,Invert'; |
| !RST | PIN 2 | istype 'Reg,Invert'; |
| SI | PIN 5 | istype 'Reg,Buffer'; |
| "Expansion Interface Signals" | | |
| !S1 | PIN 10; | |
| !S0 | PIN 11; | |
| XCLK | PIN 8 | istype 'Com,Buffer'; |
| BJAM | PIN 18 | istype 'Com,Buffer'; |
| BDAT | PIN 19 | istype 'Com,Buffer'; |
| !REQ3 | PIN 24 | istype 'Com,Invert'; |
| !REQ2 | PIN 27 | istype 'Com,Invert'; |
| !REQ1 | PIN 3 | istype 'Com,Invert'; |
| !REQ0 | PIN 4 | istype 'Com,Invert'; |
| !INIT | PIN 7 | istype 'Reg,Invert'; |
| "LED Interface Signals" | | |
| TCLK | PIN 16 | istype 'Reg,Buffer'; |
| !LED5 | PIN 38 | istype 'Reg,Invert'; |
| !LED4 | PIN 39 | istype 'Reg,Invert'; |
| !LED3 | PIN 40 | istype 'Reg,Invert'; |
| !LED2 | PIN 41 | istype 'Reg,Invert'; |
| !LED1 | PIN 42 | istype 'Reg,Invert'; |
| !LED0 | PIN 43 | istype 'Reg,Invert'; |
| TP7 | NODE | istype 'Reg,Buffer'; |
| TP6 | NODE | istype 'Reg,Buffer'; |
| TP5 | NODE | istype 'Reg,Buffer'; |
| TP4 | NODE | istype 'Reg,Buffer'; |
| TP3 | NODE | istype 'Reg,Buffer'; |
| TP2 | NODE | istype 'Reg,Buffer'; |
| TP1 | NODE | istype 'Reg,Buffer'; |
| TP0 | NODE | istype 'Reg,Buffer'; |
| "Misc. Signals" | | |
| CLK | PIN 13; | |
| OSC20MHZ | PIN 33; | |
| RESETDRV | PIN 17; | |
| INITX | NODE; | |
| "Vectors" | | |
| TP70 | = [TP7..TP0] | |
| TP71 | = [TP7..TP1] | |
| TP60 | = [TP6..TP0]; | |
| TP50 | = [TP5..TP0]; | |
| LED | = [LED5..LED0]; | |

TABLE A-continued

| REQ30 | = [REQ3..REQ0]; |
|---|---|
| EQUATIONS | |
| "IMR+ Interface Logic" | |
| X1 | = XCLK; |
| RST | := INIT; |
| TEST | = RST.d; |
| SI | := RST.d & SI.d & !TP3; |
| COL | = !ACK.fb & (REQ3 # REQ2 # REQ1 # REQ0); |
| ACK | = REQ3 & !REQ2 & !REQ1 & !REQ0 # !REQ3 & REQ2 & !REQ1 & !REQ0 # !REQ3 & !REQ2 & REQ1 & !REQ0 # !REQ3 & !REQ2 & !REQ1 & REQ0; |
| JAM | = BJAM; |
| DAT | = BDAT; |
| "Expansion Interface Logic" | |
| XCLK | = OSC20MHZ; |
| INITX | := RESETDRV; |
| TNIT | := INITX; |
| REQ30 | = REQ; |
| BJAM | = JAM; |
| BDAT | = DAT; |
| "LED Interface Logic" | |
| TCLK | := !RST.d & !TCLK.d; |
| TP7 | := !RST.d & (SI.d # !TCLK.d & SO # TCLK.d & TP7); |
| TP60 | := !RST.d & (!TCLK.d & TP71 # TCLK.d & TP60); |
| LED | := !RST.d & (!TCLK.d & STR & TP50 # ! (!TCLK.d & STR) & LED.d); |
| "TRISTATES" | |
| REQ3.oe | = !S1 & !S0; |
| REQ2.oe | = !S1 & S0; |
| REQ1.oe | = S1 & !S0; |
| REQ0.oe | = S1 & S0; |
| INIT.oe | = S1 & S0; |
| XCLK.oe | = S1 & S0; |
| BJAM.oe | = ACK.fb & REQ; |
| BDAT.oe | = ACK.fb & REQ; |
| JAM.oe | = !REQ; |
| DAT.oe | = !REQ; |
| "CLOCK SETTINGS" | |
| RST.clk | = CLK; |
| SI.clk | = CLK; |
| INITX.clk | = CLK; |
| INIT.clk | = CLK; |
| TCLK.clk | = CLK; |
| TP70.clk | = CLK; |
| LED.clk | = CLK; |
| END | |

What is claimed is:

1. An electrical device comprising;
   a circuit having a local request line and an acknowledge line; and
   an arbiter comprising a local request terminal coupled to said local request line, an acknowledge terminal coupled to said acknowledge line, and a plurality of remote request terminals, wherein in response to an active signal on said local request terminal said arbiter drives a signal active on a first remote request terminal and thereafter drives a signal active on said acknowledge terminal in the absence of an active signal on each of said remote request terminals other than the first remote request terminal.

2. The electrical device of claim 1,
   wherein said circuit is a repeater circuit comprising a collision line and said arbiter further comprises a collision terminal, said collision line being coupled to said collision terminal,
   wherein in response to said active signal on said local request terminal and an active signal on any remote request terminal said arbiter drives a signal active on said collision terminal.

3. The electrical device of claim 1 wherein said circuit is comprised in an integrated circuit.

4. The electrical device of claim 3 wherein said arbiter is comprised in a programmable logic device.

5. The electrical device of claim 1 wherein said circuit and said arbiter are both comprised in a single integrated circuit.

6. The electrical device of claim 1 further comprising a user configurable element, wherein said arbiter further comprises an identity terminal, said identity terminal being coupled to said user configurable element.

7. The electrical device of claim 6 wherein said user configurable element is a jumper.

8. A system comprising a plurality of electrical devices coupled to one another through a bus, a first electrical device comprising:

a circuit having a local request line and an acknowledge line; and an arbiter comprising (i) a local request terminal coupled to said local request line, (ii) an acknowledge terminal coupled to said acknowledge line, and (iii) a plurality of remote request terminals, each remote request terminal being coupled through said bus to an arbiter of an electrical device other than said first electrical device, wherein in response to an active signal on said local request terminal said arbiter drives a signal active on a first remote request terminal and thereafter drives a signal active on said acknowledge terminal in the absence of an active signal on each of said remote request terminals other than said first remote request terminal.

9. The system of claim 1 further comprising an identity cable having a left end and a right end, said cable comprising:

a plurality of cable connectors, a left cable connector of said plurality of cable connectors being located at said left end, a right cable connector of said plurality of cable connectors being located at said right end, each of said cable connectors comprising a plurality of cable terminals, at least one of said cable terminals being predetermined to be coupled to a device terminal in each of said electrical devices, said device terminal supplying a first signal at a predetermined first voltage level;

a plurality of electrical conductors comprising said bus, each electrical conductor being flexible, each electrical conductor being insulated from another electrical conductor, at least one electrical conductor being connected to said predetermined cable terminal in each of said cable connectors;

wherein at least two cable terminals in one of said plurality of cable connectors are coupled to each other such that appearance of said first signal on one of said two cable terminals indicates an identity of one of said electrical devices.

10. An electrical device comprising:

a circuit having a local request line and an acknowledge line;

means for arbitration of a shared resource, said means for arbitration having a local request terminal and a plurality of remote request terminals, said local request terminal being coupled to said local request line, said means for arbitration including:

first means for driving a first signal active on a first remote request terminal in response to an active signal on said local request terminal; and second means for driving a second signal active on said acknowledge line in the absence of an active signal on each of said remote request terminals other than said first remote request terminal.

11. The electrical device of claim 10 wherein said circuit is a repeater circuit comprising a collision line and said means for arbitration further includes:

third means for driving a third signal active on said collision line in response to said active signal on said local request line and an active signal on any remote request terminal.

12. The electrical device of claim 11 wherein said repeater circuit is comprised in an integrated circuit.

13. The electrical device of claim 11 wherein said arbiter means comprises a programmable logic device.

14. The electrical device of claim 11 wherein said repeater circuit and said arbiter means are both comprised in a single integrated circuit.

15. The electrical device of claim 14 further comprising a user configurable element, wherein said arbiter means further comprises an identity terminal, said identity terminal being coupled to said user configurable element.

16. The electrical device of claim 15 wherein said user configurable element is a fuse.

17. A method for distributed arbitration of a resource shared by a plurality of electrical devices, each electrical device comprising a circuit having a local request line and an acknowledge line, said method comprising the steps of:

providing an arbiter in each of said electrical devices, said arbiter comprising a local request terminal, an acknowledge terminal and a plurality of remote request terminals, said providing step comprising coupling said local request terminal to said local request line and coupling said acknowledge line to said acknowledge terminal coupled to said acknowledge line;

causing said arbiter to drive a signal active on a first remote request terminal in response to an active signal on said local request terminal; and thereafter causing said arbiter to drive a signal active on an acknowledge terminal in the absence of an active signal on each of said remote request terminals other than said first remote request terminal.

18. A method for arbitration of a resource shared by a plurality of electrical devices, said method comprising:

supplying a clock signal to each of said electrical devices;

receiving a first signal for said resource from a first electric device; and driving a second signal to each electric device other than said first electric device in response to said first signal for said resource.

19. The method of claim 18 further comprising:

using a user configurable element in each of said electrical devices to identify one of said electrical devices as a master electrical device, wherein said master electrical device supplies said clock signal.

20. A method for arbitration of a resource shared by a plurality of electrical devices, said method comprising:

supplying a clock signal to each of said electrical devices;

receiving an active request signal for said resource from a first electric device;

driving a request signal active to each electrical device other than said first electric device in response to said active request signal for said resource; and driving an acknowledge signal active to said first electrical device in the absence of an active request signal originating in each electrical device other than said first electrical device.

21. The method of claim 18, wherein said first signal and said second signal are request signals.

22. The method of claim 18 further comprising:

driving a third signal to said first electrical device in the absence of an fourth signal originating from one of said each electrical device other than said first electrical device.

23. The method of claim 22, wherein said third signal is an acknowledgment signal.

24. The method of claim 22, wherein said fourth signal is a request signal.

25. The method of claim 18 further comprising:

driving a third signal to said first electrical device in the presence of a fourth signal originating from one of said each electrical device other than said first electrical device.

26. The method of claim 25, wherein said third signal is a collision signal.

27. The method of claim 25, wherein said fourth signal is a request signal.

28. The method of claim 19, wherein said using a user configurable element comprises grounding one or more identity lines between said first electrical device and another electrical device.

29. The method of claim 17 further comprising the step of:

causing said arbiter to drive a signal active on said collision terminal in response to said active signal on said local request terminal and an active signal on any remote request terminal other than said first remote request terminal.

* * * * *